(12) United States Patent
Hüger et al.

(10) Patent No.: US 10,214,062 B2
(45) Date of Patent: Feb. 26, 2019

(54) ASSISTING METHOD AND DOCKING ASSISTANT FOR COUPLING A MOTOR VEHICLE TO A TRAILER

(71) Applicant: VOLKSWAGEN AG, Wolfsburg (DE)

(72) Inventors: Philipp Hüger, Rühen (DE); Stefan Brosig, Hankensbüttel (DE)

(73) Assignee: Volkswagen AG (DE)

(*) Notice: Subject to any disclaimer, the term of this patent is extended or adjusted under 35 U.S.C. 154(b) by 0 days.

(21) Appl. No.: 15/629,785

(22) Filed: Jun. 22, 2017

(65) Prior Publication Data
US 2018/0001721 A1 Jan. 4, 2018

(30) Foreign Application Priority Data
Jun. 29, 2016 (DE) .................. 10 2016 211 785

(51) Int. Cl.
*B60D 1/36* (2006.01)
*B60D 1/62* (2006.01)
*B60R 1/00* (2006.01)
*G06T 7/11* (2017.01)
*G06T 7/70* (2017.01)
(Continued)

(52) U.S. Cl.
CPC ............. *B60D 1/36* (2013.01); *B60D 1/62* (2013.01); *B60R 1/00* (2013.01); *B60R 1/003* (2013.01); *G05D 1/0225* (2013.01); *G05D 1/0246* (2013.01); *G06K 9/00791* (2013.01); *G06T 7/11* (2017.01); *G06T 7/70* (2017.01); *B60R 2300/306* (2013.01); *B60R 2300/806* (2013.01); *B60R 2300/808* (2013.01); *G06F 3/041* (2013.01);
(Continued)

(58) Field of Classification Search
CPC . B60D 1/36; B60D 1/58; B60K 35/00; B62D 13/06; B60R 1/00; B60G 7/006
See application file for complete search history.

(56) References Cited

U.S. PATENT DOCUMENTS 6,690,413 B1* 2/2004 Moore ................ B60R 1/00
348/148
7,777,615 B2 8/2010 Okuda et al.
(Continued)

FOREIGN PATENT DOCUMENTS

DE 102012001380 A1 8/2012

OTHER PUBLICATIONS

Search Report for German Patent Application No. 10 2016 211 785.8; dated May 9, 2017.
(Continued)

*Primary Examiner* — Yuri Kan
(74) *Attorney, Agent, or Firm* — Barnes & Thornburg LLP

(57) ABSTRACT

An assist method for coupling a motor vehicle to a trailer, wherein the motor vehicle includes a trailer coupling, at least one camera, a display, and an electronic unit, and wherein the trailer includes a tow bar for the trailer coupling. The assist method captures a first image of at least one tow bar of a trailer by the camera, displays the first image on the display, selects a first region in the first image in which the tow bar is located, enlarges the selected first region to produce a second image, displays the second image on the display, selects a second region in the second image in which the tow bar is located, and determines a trajectory of the motor vehicle for coupling the trailer assuming that the tow bar is located in the second region.

12 Claims, 2 Drawing Sheets

(51) Int. Cl.
G05D 1/02 (2006.01)
G06K 9/00 (2006.01)
G06F 3/041 (2006.01)
G06F 3/0484 (2013.01)

(52) U.S. Cl.
CPC ...... *G06F 3/04842* (2013.01); *G06F 3/04845* (2013.01)

(56) References Cited

U.S. PATENT DOCUMENTS

| | | | | |
|---|---|---|---|---|
| 2009/0106990 | A1* | 4/2009 | Harrill | B60G 7/006 33/288 |
| 2010/0078962 | A1* | 4/2010 | Kronenberg | B60D 1/58 296/180.2 |
| 2011/0001614 | A1* | 1/2011 | Ghneim | B60K 35/00 340/435 |
| 2014/0229070 | A1* | 8/2014 | Witting | B62D 13/06 701/42 |
| 2016/0023601 | A1* | 1/2016 | Windeler | B60R 1/00 348/118 |
| 2016/0288601 | A1* | 10/2016 | Gehrke | B60D 1/36 |

OTHER PUBLICATIONS

Search Report for European Patent Application No. 17174336.2; dated Nov. 6, 2017.

* cited by examiner

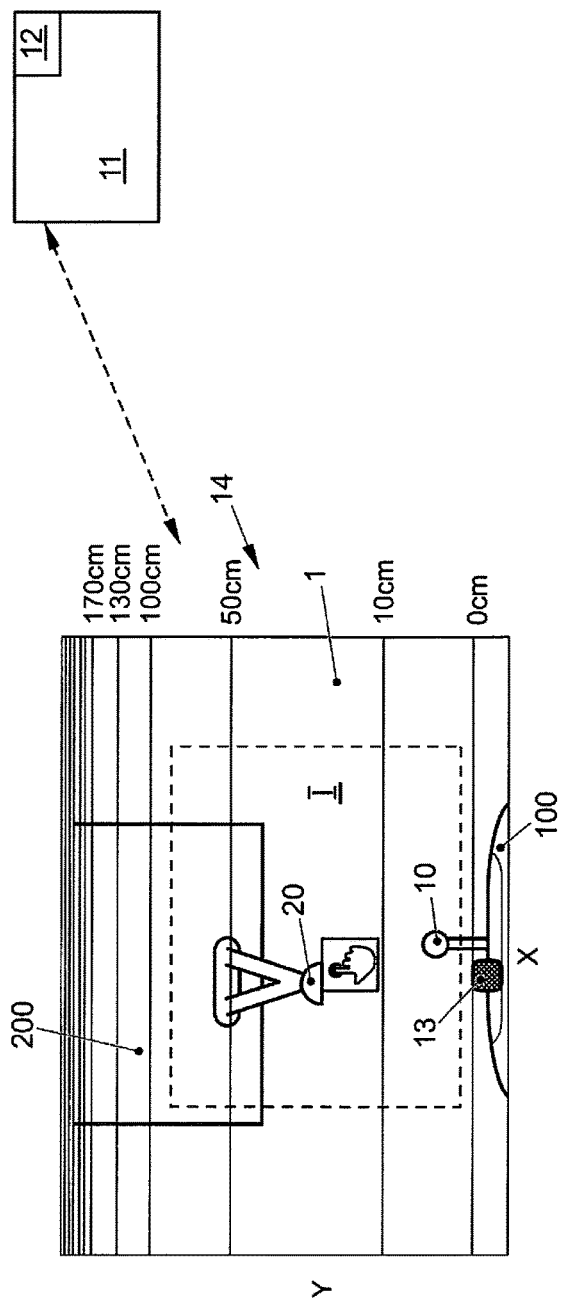

ASSISTING METHOD AND DOCKING ASSISTANT FOR COUPLING A MOTOR VEHICLE TO A TRAILER

PRIORITY CLAIM

This patent application claims priority to German Patent Application No. 10 2016 211 785.8, filed 29 Jun. 2016, the disclosure of which is incorporated herein by reference in its entirety.

SUMMARY

Illustrative embodiments relate to an assist method for coupling a motor vehicle to a trailer, wherein the motor vehicle is embodied with a trailer coupling, at least one camera, a display, and an electronic unit, and wherein the trailer is embodied with a tow bar for the trailer coupling. Moreover, illustrative embodiments relate to a corresponding coupling assist device for a motor vehicle having a trailer coupling.

BRIEF DESCRIPTION OF THE DRAWINGS

Disclosed embodiments are illustrated with reference to the figures. Here, the features can be essential to the disclosed embodiments individually or in an arbitrary combination. It is to be noted that the figures are only descriptive in character and are not to be thought of as limiting the disclosed embodiments in any form. In the figures:

FIG. 1 illustrates schematically a first image of a tow bar on a display;

FIG. 2 illustrates in table form a locating accuracy for the tow bar on the display in different regions of the first image;

DETAILED DESCRIPTION

Figures 3, 4:
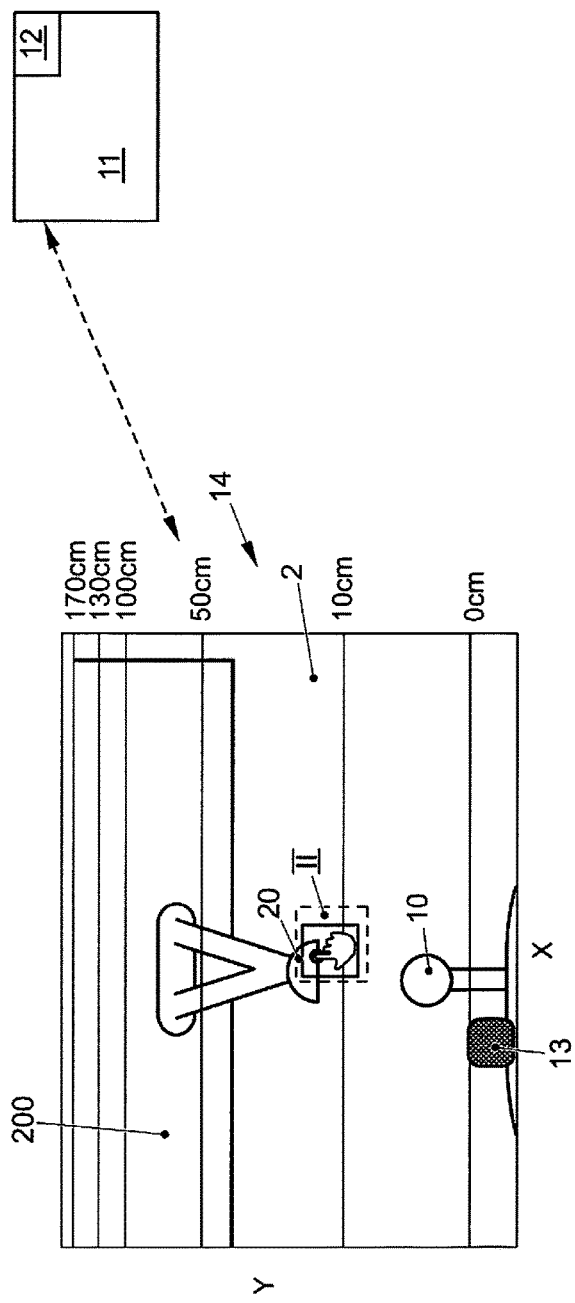
FIG. 3 illustrates schematically a second image of the tow bar on the display.
FIG. 4 illustrates in table form a locating accuracy for the tow bar on the display in different regions of the second image.

To couple a trailer to a motor vehicle, it is necessary to drive the motor vehicle in a targeted manner to a tow bar of the trailer. Motor vehicles that comprise a camera, by way of example a rear-view camera, are known and the camera can capture images of a region behind the motor vehicle and a tow bar of the trailer that is in the region. Moreover, such motor vehicles comprise a display that can be arranged by way of example in a dashboard of the motor vehicle to display the images that are captured using the camera. Here, a driver can manually touch the tow bar that is displayed on the display and consequently mark the tow bar to trigger an approach maneuver so as to couple the trailer to the tow bar. A motor vehicle of this type is disclosed by way of example in U.S. Pat. No. 7,777,615. However, one drawback in this case has proven to be that high tolerances occur when manually marking on the display. Normally, the driver uses his fingers for the marking procedure. Here, it is necessary to take into account an average finger width of approximately 1 cm. Such a procedure of marking on the display involves a high degree of inaccuracy in relation to the position of the tow bar in reality. Moreover, the accuracy of the marking on the display is limited by the pixel resolution of the display. This inaccuracy of the marking procedure can lead to the fact that multiple attempts at coupling can fail.

For this reason, the disclosed embodiments overcome at least in part the drawbacks in the prior art. Disclosed embodiments provide an assist method for coupling a motor vehicle to a trailer, and a corresponding coupling assist device for a motor vehicle having a trailer coupling, the assist method and coupling assist device rendering it possible to precisely and in a targeted manner carry out a coupling procedure.

The above is achieved using an assist method for coupling a motor vehicle to a trailer according to the independent method claim, wherein the motor vehicle is embodied with a trailer coupling, at least one camera, a display, and an electronic unit, and wherein the trailer is embodied with a tow bar for the trailer coupling, the method comprising the following operations:

a) capturing a first image of at least one tow bar of a trailer using the camera, b) displaying the first image on the display, c) selecting a first region in the first image in which the tow bar is located, wherein a coordinate-dependent locating accuracy for the tow bar is allocated to the first region, d) enlarging the selected first region to produce a second image, e) displaying the second image on the display, f) selecting a second region in the second image in which the tow bar is located, wherein an increased coordinate-dependent locating accuracy for the tow bar with respect to the locating accuracy allocated to the first region is allocated to the second region, g) determining a trajectory of the motor vehicle for coupling the trailer assuming that the tow bar is located in the second region.

The disclosed embodiments reside in the fact that, when determining a trajectory for coupling the motor vehicle to the trailer, a coordinate-dependent locating accuracy for the tow bar is taken into account in the at least one region that is recorded using the camera and displayed on the display. The coordinate-dependent locating accuracy for the tow bar means that for the purpose of marking the tow bar on the display not only the coordinates on the display are taken into account but rather also the distance from the camera with respect to a point that is to be recorded in reality as an additional coordinate.

An average finger width of approximately 1 cm on the display covers an ever-larger region in reality with the increasing distance from the camera to the point that is to be recorded in reality. Consequently, with the increasing distance it becomes ever more difficult to drive the trailer coupling onto the tow bar in a targeted manner. According to the disclosed embodiments, at least two images of the tow bar of the trailer are taken into account using the camera. The first image is used to provisionally mark the tow bar or in other words to provisionally select a first region in the first image in which the tow bar is located. Here, the first region is selected around the finger of the user. The second image is obtained by virtue of the fact that the first region is accordingly enlarged to the display size or zooming into the first region is carried out.

Only then after at least one enlargement of the first region can the user mark the tow bar in the second enlarged image, wherein the marking procedure can then be performed in the second image with a locating accuracy that is increased with respect to the locating accuracy in the first image. Here, the second region corresponds by way of example to a square or a circle having a diameter that corresponds approximately to a finger width of the user. The second region finally covers the tow bar with an increased locating accuracy and consequently marks the tow bar in the second image. The second region is consequently selected as a target point for the approach maneuver for the purpose of coupling the motor vehicle to the trailer. Consequently, the user can mark precisely and with an increased locating accuracy the tow bar on the display, as a result of which it is possible to perform an approach maneuver so as to couple the trailer to the tow bar in a precise and targeted manner.

Furthermore, it is feasible that at least one or even multiple further images and furthermore at least one or multiple further regions can be selected to further increase the accuracy of marking the tow bar on the display. Moreover, the disclosed embodiments can provide that after determining the trajectory of the motor vehicle so as to couple the trailer it is possible for the approach maneuver to be performed automatically and/or that this trajectory can be depicted for the user on the display and/or that a corresponding steering angle can be proposed to the user.

Moreover, it is feasible in operation c) and/or in operation f) for a user to be able to mark the tow bar in the first image and/or in the second image using a finger to select the first region and/or the second region. Consequently, the user can actively control the assist method for coupling the motor vehicle to the trailer. Moreover, if multiple tow bars are located in the region recorded by the camera and if an automatic image recognition cannot differentiate between the multiple tow bars, the selection of the correct tow bar can be entrusted to the user. Here, the display can be used as an interface to a coupling assist device.

Moreover, it is feasible in operation c) and/or in operation f) that the tow bar can be determined in the first image and/or in the second image using an image recognition unit to select the first region and/or the second region. As a consequence, the user can hence be unburdened and that the approach maneuver for coupling the trailer to the tow bar can be initiated automatically. Moreover, it is feasible in either of the operations c) or f) that the image recognition unit can operate and in the other operation that the user can operate. Furthermore, it is feasible that if in operation c) and/or in operation f) the tow bar is determined using an image recognition unit, the user can be prompted to confirm the selection of the first and/or the second region. Consequently, possible errors of the automatic image recognition unit can be avoided.

Furthermore, it is feasible that in operation g) when determining the trajectory of the motor vehicle for coupling the trailer it is possible to take into account an increased, coordinate-dependent locating accuracy for the tow bar in the second region. In the enlarged second image, the user can cover, by his finger width, a region that in reality is substantially smaller than the region covered in the first image. Consequently, the tow bar can be marked clearly more precisely in the second image in comparison to the real position of the tow bar than in the first image. As a consequence, the trajectory of the motor vehicle for coupling the trailer can be performed in a precise and targeted manner.

Furthermore, it is feasible that in operation e) and/or in operation f) a user is prompted to confirm that the tow bar is located within the first region and/or within the second region. Consequently, the first region and/or the second region can again be checked by active participation of the user. If it is established by the check that the first region and/or the second region does not/do not precisely cover the tow bar, then the respective region can be selected again. Moreover, if it is established by the check that the second region is too large then the second region can be enlarged again to obtain a third image in which a third region with the tow bar can be selected. Consequently, it is possible to improve the procedure of identifying the correct position of the tow bar on the display compared to the position of the tow bar on reality.

The method can comprise at least one further operation, h), displaying the trajectory that is determined in operation g) on the display. Consequently, it is possible to visualize the correct trajectory of the motor vehicle for coupling the trailer. This increases the operating comfort of the motor vehicle in the event of a manually performed approach. In the event of an automatic approach maneuver, displaying the correct trajectory on the display can serve to re-assure the user.

Furthermore, it is feasible that the method can comprise at least one further operation automatically navigating the motor vehicle so as to couple the trailer in accordance with the trajectory that is determined in operation g).

Consequently, the user can be unburdened from performing a complicated approach maneuver for coupling the motor vehicle to the trailer.

Moreover, this is achieved using a coupling assist device for a motor vehicle having a trailer coupling according to the independent device claim, the coupling assist device comprising at least one camera, a display and an electronic unit, wherein the electronic unit is configured for the purpose of determining a trajectory of the motor vehicle for coupling a trailer, wherein a coordinate-dependent locating accuracy for a tow bar of the trailer is taken into account when determining the trajectory in at least one region in which the tow bar is located, the region being recorded using the camera and displayed on the display. It is possible for the electronic unit to be embodied for the purpose of processing a first image of at least one tow bar of a trailer using the camera, for the purpose of automatically or in accordance with a command from the user selecting a first region in the first image in which the tow bar is located and allocating a coordinate-dependent locating accuracy for the tow bar to the first region. Moreover, it is possible for the electronic unit to be embodied for the purpose of enlarging the selected first region to produce a second image and subsequently to display the second image on the display. Moreover, it is possible for the electronic unit to be embodied so as to select a second region in the second image in which the tow bar is located and to allocate an increased coordinate-dependent locating accuracy for the tow bar to the second region than allocated to the first region. Moreover, the electronic unit can be embodied for the purpose of determining a trajectory of the motor vehicle for coupling the trailer assuming that the tow bar is located in the second region and where appropriate to initiate an automatic approach maneuver to couple the motor vehicle to the trailer in accordance with the determined trajectory. Furthermore, with the disclosed coupling assist device, the identical benefits are achieved that have also been described in conjunction with the disclosed assist method. To avoid repetition, reference is made entirely thereto.

Furthermore, the disclosed embodiments can provide that the display can be a touch display that can be used as an interface between a user and the coupling assist device. Here, the display can consequently be a combined input and output device that can render it possible to communicate with the electronic unit and to control the coupling assist device. The user can directly control the coupling assist device by touching parts of an image.

Moreover, it is feasible that the camera can be a rear-view camera. A rear-view camera is already present in most motor vehicles. The disclosed coupling assist device can consequently function with a camera that is provided. As a consequence, it is possible to save on expenditure for a separate camera. Nevertheless, it is also feasible that a specific camera can be arranged in the region of the trailer coupling. Consequently, the camera can lie at approximately the height of the tow bar to make the images that are to be processed less susceptible to error tolerances owing to an inclined camera angle. Moreover, it is feasible that images from multiple cameras can be checked to identify and where appropriate verify the correct position of the tow bar. Moreover, it is feasible that images from multiple cameras can be checked to obtain a perspective view of a tow bar and to be able to take into account an improved coordinate-dependent locating accuracy for the tow bar.

Furthermore, it is likewise feasible that the electronic unit can comprise an image recognition unit to automatically find the tow bar in at least one region that is recorded by the camera and displayed on the display. As a consequence, it can be rendered possible to automatically find the tow bar in the respective camera image.

Furthermore, the disclosed embodiments can provide that it is possible to integrate the coupling assist device in a parking assist device. Consequently, a parking assist device that is provided can be improved and upgraded. Here, it is feasible that corresponding software can be implemented in an existing electronic unit of the parking assist device to implement the disclosed assist method for coupling the motor vehicle to the trailer.

Identical parts are always provided with the same reference numerals in this case so that reference is generally only made once to the individual reference numerals.

Here, FIG. 1 illustrates a first image 1 of a tow bar 20 of a trailer 200 on a display 14 that can be arranged in a motor vehicle 100 by way of example in a dashboard of the motor vehicle 100. Here, the display 14 can display images from a camera 13, by way of example from a rear-view camera 13, of the motor vehicle 100. Here, the rear-view camera 13 can record images of a rear region of the motor vehicle 100. If the motor vehicle 100 is oriented at the rear to the tow bar 20 of the trailer 200, the tow bar 20 is displayed on the display 14. The display 14 can consequently assist in navigating a trailer coupling 10 of the motor vehicle 100 to the tow bar 20 of the trailer 200 so as to facilitate coupling the trailer 200 to the motor vehicle 100. To arrive in a targeted manner at the tow bar 20 with the trailer coupling 10 of the motor vehicle 100, it is possible for a user to manually touch the tow bar 20 on the display, usually using a finger, and consequently mark the tow bar. The marking procedure is necessary to determine a trajectory or a steering angle for correctly approaching the tow bar 20. However, when manually marking the tow bar 20 on the display 14, it is possible for high tolerances to occur, as is explained with reference to a table in FIG. 2.

A finger has an average width of approximately 1 cm. A mark of this type at different heights on the display 14 covers different sized regions in reality, the heights on the display corresponding to different distances from the camera 13 in reality. According to the disclosed embodiments it was established that a targeted coupling of the motor vehicle 100 to the trailer 200 is greatly dependent on the coordinate-dependent locating accuracy for the tow bar 20 in different regions of an image that is displayed on the display 14. The coordinate-dependent locating accuracy for the tow bar 20 in different regions of an image means allocating to a two-dimensional coordinate system Y, X of the display 14 an additional coordinate that corresponds to the distance from the camera 13 to a point in reality that is to be recorded. The further the point that is to be recorded in reality is from the camera 13, the larger the region in reality that is marked with the finger of the user on the display 14.

Here, FIG. 2 illustrates exemplary locating accuracies for multiple regions on the display 14. In this case, the multiple regions are defined between multiple lines that are arranged horizontally on the display 14 and that illustrate the distance from the camera 13 to a point in reality that is to be recorded. The multiple lines on the display 14 are at different heights Y in the two-dimensional coordinate system X, Y of the display 14. Here, the lowest line corresponds to a distance of 0 cm from the camera 13, the next line above corresponds to a distance of 10 cm, the next line corresponds to a distance of 50 cm, the next line corresponds to a distance of 100 cm, the next line corresponds to a distance of 130 cm, the next line corresponds to a distance of 170 cm etc. The regions between the lines are disclosed in the first line in the table in FIG. 2. FIG. 2 illustrates, in the second line, an estimated size of a region that is to be covered by a finger width of a user of approximately 1 cm that in reality is disclosed in the first line in dependence upon the respective region on the display 14. Here, it is additionally feasible that the actual finger width of a user is actively detected on the display 14 and can be taken into account by an electronic unit 11 to adapt the region that is to be covered in reality to the actual finger width of the user. The table in FIG. 2 is used in this case only as an example for the finger width of the user of approximately 1 cm. The display 14 can have different sizes and/or different pixel resolutions that can be taken into account by the electronic unit 11. The data in the table in FIG. 2 are disclosed in an exemplary manner for a display 14 that can measure 9.2" and that can have a resolution of 1280×640 pixels. Here, it is evident that, with the increasing height Y in the two-dimensional coordinate system X, Y of the display 14, the region that is to be covered in reality becomes ever larger as a result of which the locating accuracy of the tow bar 20 on the display 14 is constantly decreased. Consequently, with the increasing distance from the camera 13, it becomes ever more difficult to drive the trailer coupling 10 in a targeted manner onto the tow bar 20.

In the example of FIG. 1, the tow bar 20 is located at a distance between 10 cm and 50 cm from the camera 13. This corresponds to a covered region of approximately 17 cm for a 9.2" sized display 14. If the spherical head of the trailer coupling 10 is approximately 5 cm large, the region of 17 cm is obviously too large to mark the tow bar 20 precisely on the display 14. As a consequence, it is even possible for a coupling attempt to fail.

To increase the locating accuracy for the tow bar 20 on the display 14, at least one second image 2 of the tow bar 20 of the trailer 200 is taken into account. The first image 1 in FIG. 1 is used consequently only to provisionally mark the tow bar 20 or to provisionally select a first region I in the first image 1 in which the tow bar 20 is to be located. The first region I is perspectively selected around the finger of the user in this case. Afterwards, the display automatically zooms into the enlarged first region I. FIG. 3 finally illustrates the second image 2 that represents an enlargement of the first region I to a corresponding display size. In the second image 2, it is possible for the user to more precisely mark the tow bar 20 than in the first image 1. In the enlarged second image 2, the dependency of the distance with respect to the camera 13 and the region that is to be covered in reality is smaller than in the first image 1.

Moreover, FIG. 4 illustrates exemplary locating accuracies for multiple regions on the display 14 that are indicated between horizontal lines in FIG. 3 and are at different heights Y in the second image 2. Different heights Y in the second image 2 correspond to different distances from the camera 13 to the point that is to be recorded. Here, the lowest line corresponds to a distance of 0 cm, the next line above corresponds to a distance of 10 cm, the next line corresponds to a distance of 50 cm, the next line corresponds to a distance of 100 cm, the next line corresponds to a distance of 130 cm and the uppermost line corresponds to a distance of 170 cm. The regions between the lines are disclosed in the first line in the table in FIG. 4. FIG. 2 illustrates in the second line finally an estimated size of a region that is to be covered, in reality for a finger width that now corresponds in the enlarged second image 2 to only approximately one pixel. With the aid of FIG. 4 it is consequently evident that in the enlarged second image 2 the region that is to be covered in reality is smaller than in the first image 1 even with the increasing distance from the camera 13 with respect to the tow bar 20. Consequently, the user can mark the tow bar 20 in the second image 2 with a high degree of accuracy than in the first image, as a result of which an approach maneuver can be performed so as to couple the motor vehicle 100 to the trailer 200 in a more targeted manner than with the aid of only the first image 1.

The second image 2 that corresponds to the zoomed-in first region I is consequently used for the purpose of performing a correction of the marking procedure of the tow bar 20. As a consequence, a more precise marking of the tow bar 20 is rendered possible. After zooming in, it is possible for a finger width of the user of approximately 1 cm to select only one pixel in the second image 2 that to a region in reality of approximately 2 mm in the case of a 10-50 cm sized gap in the camera image, approximately 3 mm in the case of a 50-100 cm sized gap, approximately 5 mm in the case of a 100-130 cm gap and approximately 6.4 mm in the case of a 1.30m-1.70 m gap. A 5 cm sized spherical head of the trailer coupling 10 can consequently be driven in a more precise manner to the selected tow bar 20.

The second region II is illustrated in FIG. 3 as a small square around the finger of a user. Here, the second region II covers the tow bar with an increased accuracy with respect to the first region I in FIG. 1. Here, the second region II is superimposed over the tow bar 20 and can be used as a proper target point for the trailer coupling 10 of the motor vehicle 100 to approach the tow bar 20 of the trailer 200. Consequently, with the aid of the image 2, the procedure of marking the tow bar on the display 14 becomes easier and more precise, as a result of which it is possible in a simpler and more precise manner to drive the trailer coupling 10 in a targeted manner on to the tow bar 20.

Furthermore, with the aid of the tow bar 20 that is identified on the display 14, it is possible to estimate the position of the tow bar in reality and to calculate a precise trajectory and/or a specific steering angle of the motor vehicle 100 for coupling the trailer 200. Moreover, this trajectory can be visualized on the display 14. Finally, the motor vehicle 100 can be automatically navigated to couple to the trailer 200, by way of example by a disclosed coupling assist device that is integrated into the parking assist device. Alternatively, the trajectory that is displayed on the display 14 can be used as a navigation aid for the user to drive the motor vehicle 100 manually so as to couple to the trailer 200.

It is possible to implement a corresponding assist method for coupling the motor vehicle 100 to the trailer 200 with the aid of a coupling assist device. In this case, the coupling assist device can comprise a specific electronic unit 11 that can communicate with the display 14 and that can implement the method operations, the method operations being described above.

The above-mentioned description of the FIGS. 1 to 4 describes the disclosed embodiments solely within the scope of examples. Naturally, individual features of the disclosed embodiments, insofar as it is technically expedient, can be freely combined with one another without departing from the scope of the disclosed embodiments. By way of example, even more images can be captured in the process and accordingly even more regions can be selected for the purpose of determining the correct position of the tow bar 20 on the display 14. In an alternative to manually using a finger to touch the display 14, it is possible to provide an image recognition unit 12 for selecting a first region I and/or a second region II in the electronic unit 11. Consequently, it is possible for the procedure of identifying the tow bar 20 in the camera image to be automated. Nevertheless, it is however also feasible that to select the tow bar 20 in the first image 1 and/or in the second image 2 both the image recognition unit 12 and the user can be drawn upon to achieve a combined assist method. It is feasible in this case that the user can manually verify the automatic selection of the tow bar 20 using the image recognition unit 12 and/or that the user can select one of multiple identified tow bars 20 if the image recognition unit 12 cannot differentiate the correct tow bar 20 from the other tow bars.

LIST OF REFERENCE NUMERALS

1 First image
2 Second image
10 Trailer coupling
11 Electronic unit
12 Image recognition unit
13 Camera
14 Display
20 Tow bar
100 Motor vehicle
200 Trailer
I First region
II Second region

The invention claimed is:

1. An assist method for coupling a motor vehicle to a trailer, wherein the motor vehicle is embodied with a trailer coupling, at least one camera, a display and an electronic unit, and wherein the trailer is embodied with a tow bar for the trailer coupling, the method comprising:
  a) capturing a first image of at least one tow bar of a trailer by the camera;
  b) displaying the first image on the display;
  c) selecting a first region in the first image in which the tow bar is located according to a user touch input, wherein a coordinate-dependent locating accuracy for the tow bar is allocated to the first region, wherein the coordinate-dependent locating accuracy includes consideration of coordinates corresponding to the user input and a distance between the camera and the tow bar, and wherein the first region is determined in relation to the size of the user touch input;
  d) enlarging the selected first region to produce a second image;
  e) displaying the second image on the display;
  f) in response to selecting the first region, automatically selecting a second region in the second image in which the tow bar is located, wherein an increased coordinate-dependent locating accuracy for the tow bar with respect to the locating accuracy allocated to the first region is allocated to the second region; and g) determining a trajectory of the motor vehicle for coupling the trailer assuming that the tow bar is located in the second region.

2. The assist method of claim 1, wherein, in operation c) and/or in operation f), a user marks the tow bar in the first image and/or in the second image using a finger to select the first region and/or the second region.

3. The assist method of claim 1, wherein, in operation c) and/or in operation f), the tow bar is determined in the first image and/or in the second image by an image recognition unit to select the first region and/or the second region.

4. The assist method of claim 1, wherein, in operation g) when determining the trajectory of the motor vehicle for coupling the trailer, the coordinate-dependent locating accuracy for the tow bar in the second region is taken into account.

5. The assist method of claim 1, wherein, in operation c) and/or in operation f), a user is prompted to confirm that the tow bar is located within the first region and/or within the second region.

6. The assist method of claim 1, further comprising an operation h) displaying the trajectory that is determined in operation g) on the display.

7. The assist method of claim 1, further comprising an operation h) automatically navigating the motor vehicle to couple the trailer in accordance with the trajectory that is determined in operation g).

8. A coupling assist device for a motor vehicle having a trailer coupling, the coupling assist device comprising:
 at least one camera;
 a display; and
 an electronic unit,
 wherein the electronic unit is embodied for the purpose of determining a trajectory of the motor vehicle for coupling a trailer, wherein when determining the trajectory a coordinate-dependent locating accuracy for a tow bar of the trailer is taken into account in at least one region in which the tow bar of the trailer is located, said region being recorded by the camera and displayed on the display, wherein the region is an automatically selected portion of a second image in which the tow bar of the trailer is located, and the second image is an enlarged portion of a first image in which the tow bar of the trailer is located that is selected according to a user touch input,
 wherein the coordinate-dependent locating accuracy includes consideration of coordinates corresponding to a user input and a distance between the at least one camera and the tow bar, and wherein the second image has a coordinate-dependent locating accuracy greater than the first image.

9. The coupling assist device of claim 8, wherein the display is a touch display that is used as an interface between a user and the coupling assist device, and/or in that the camera is a rear-view camera.

10. The coupling assist device of claim 8, wherein the electronic unit comprises an image recognition unit to automatically find the tow bar in at least one region that is recorded by the camera and displayed on the display and/or in that the coupling assist device is integrated into a parking assist device of the motor vehicle.

11. The assist method of claim 1, wherein automatically selecting includes prompting for user confirmation of the selection.

12. The coupling assist device of claim 8, wherein the automatically selected portion of the second image is confirmed by the user.

* * * * *